United States Patent

Kefalas

[15] 3,707,706

[45] Dec. 26, 1972

[54] MULTIPLE STATE MEMORY

[72] Inventor: John H. Kefalas, North Billerica, Mass.

[73] Assignee: Honeywell Information Systems, Inc., Waltham, Mass.

[22] Filed: Nov. 4, 1970

[21] Appl. No.: 86,918

[52] U.S. Cl. ...340/174 CB, 340/174 TF, 340/174 M

[51] Int. Cl. ..........................G11c 11/10, G11c 11/14

[58] Field of Search .................................340/174 CB

[56] References Cited

UNITED STATES PATENTS

| | | | |
|---|---|---|---|
| 3,445,830 | 5/1969 | Middlelhoek | 340/174 CB |
| 3,414,891 | 12/1968 | Kohn | 340/174 CB |
| 3,047,423 | 7/1962 | Eggenberger et al | 340/174 CB |

*Primary Examiner*—James W. Moffitt
*Attorney*—Ronald T. Reiling and Fred Jacob

[57] ABSTRACT

A thin film memory has an isotropic magnetic layer and a plurality of conductors arranged in columns and rows disposed over the magnetic layer. The points of intersection of the column and row conductors define storage locations within the magnetic layer which are capable of being assigned one of several storage states.

6 Claims, 18 Drawing Figures

INVENTOR
JOHN H. KEFALAS

BY [signature]

ATTORNEY

INVENTOR
JOHN H. KEFALAS

BY [signature]

ATTORNEY

MULTIPLE STATE MEMORY

BACKGROUND OF THE INVENTION

This invention relates to a data storage device for computers or the like, and more particularly to a memory device which utilizes an isotropic thin film memory plane for the storage of information in locations within the plane by the assignment of one of several storage states.

Throughout the development of computer memories, the use of anisotropic magnetic films have been explored and applied to memory devices for the storage of information therein. The characteristic of anisotropy limits the magnetic film to one axis of easy magnetization. Thus, the magnetic films of the prior art generally were capable of only two stable states, each in directions opposed to one another within the axis of easy magnetization.

Furthermore, the techniques for depositing magnetic materials to form a magnetic surface for memory storage limited the resulting film to the characteristic of anisotropy. By the teachings of Edelman, U.S. Pat. No. 3,092,511 issued June 4, 1963, magnetic films may be produced with low anisotropy, that is, films with substantially isotropic magnetic characteristics. These films have more than one axis of easy magnetization and are therefore usable for multi-state operation. With the use of an isotropic storage medium, the storage films are capable of being switched from one state to another at much higher speeds than other magnetic films of the prior art.

By the teachings of this invention, isotropic magnetic films may be implemented as a thin film memory or memory system which allows for the storage of information by its assignment to one of several storage states within the isotropic film. The invention also provides for a readout of the assigned storage state which is readily identifiable from the other possible storage states.

SUMMARY OF THE INVENTION

A feature of the invention is a thin film memory device that has a continuous magnetic surface of substantially isotropic material, characterized by a low anisoptropy and having more than one axis of easy magnetization. The magnetic moments within the magnetic film are capable of being rotated through several storage states by the application of magnetic fields of prescribed intensities. The magnetic fields for switching storage states within the magnetic film are provided by a matrix of column and row conductors which are spaced from one another and are disposed over the magnetic surface of the memory device. A current or signal applied to the conductors so disposed provides magnetic fields which couple the magnetic film. The points of intersection of the column and row conductors identify storage locations within the magnetic film.

Another feature of the invention is the ability to write information into the storage locations within the magnetic film by a first current or signal applied to at least one of the column conductors and a second current or signal applied to at least one of the row conductors. One of the currents or signals leads and is concurrent with a portion of the other at the storage location being written into. The storage state to be assigned the information so written is determined by the polarity of the last terminating current or signal.

Another feature of the invention is that the storage state so determined is along the axis of easy magnetization which is at right angles to the conductor carrying the last terminating current or signal.

Still another feature of the invention is that information may be read out of a given storage location by applying a current or signal to the column conductor associated with it to produce a magnetic flux of sufficient intensity to disturb the resultant magnetic moment of the storage state, representing the information, and sensing the resulting change in state. The degree of change in state identifies the original storage state or stored information.

Another feature of the invention is that the change of state is manifest by a signal output carried by the row conductor associated with the read storage locations and having one of four signal waveforms: no pulse, a positive pulse, a negative pulse, or a bi-polar pulse.

These and other features which are to be considered characteristic of this invention are set forth with particularity in the appended claims. The invention itself, however, as well as additional features and advantages thereof, will best be understood from the following description when considered in conjunction with the accompanying drawings.

DESCRIPTION OF THE PREFERRED EMBODIMENT

Figure 1:
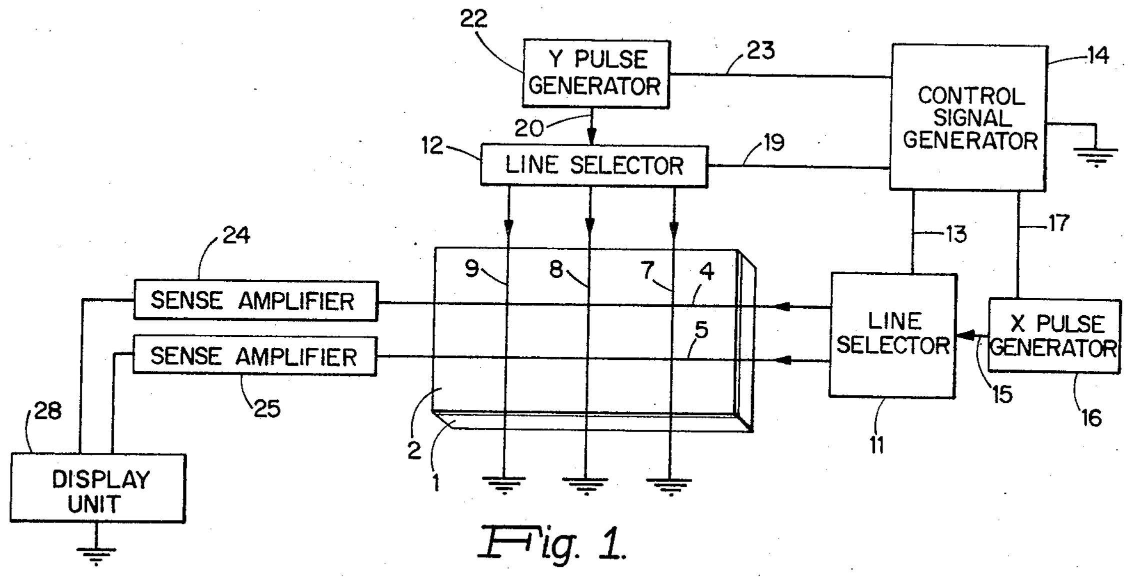
FIG. 1 is a block diagram of the isotropic memory plane and its writing and read elements which comprise the memory system that embodies features of the invention.

In FIG. 1 is shown a thin film memory system. The memory plane has a base substrate 1, which may be of glass, metal or quartz. A substrate 1 has a magnetic surface 2 which consists of a layer or plane of magnetic material which has a low anisotropy, and is therefore substantially isotropic. The characteristic of isotropy provides for more than one axis of easy magnetization within the magnetic layer and thus provides for multi-state operation. The magnetic layer or plane 2 is illustrated as being rectangular in shape; however, other shapes including circular or eliptical are easily obtainable and may be preferred for certain applications.

A method of depositing the magnetic layer upon the substrate 1 is a deposition technique taught by Edelman, U.S. Pat. No. 3,092,511 issued June 4, 1963. In accordance with his teaching, metallic salts of a $\beta$-diketone are separated-heated, and their vapors are carried by a carrier gas to a heated substrate for deposition thereon. Magnetic films can be produced by the use of a magnetic field during the condensation of the vapors upon the substrate and/or during an annealing process. For best isotropy, the condensation of the vapors and/or annealing should occur in a rotating, circular magnetic field. Isotropy, however, can be obtained with other types of magnetic fields, or with an absence of a magnetic field.

The thin magnetic alloy layer of plane 2 that is produced by Edelman's teaching has useful magnetic properties for magnetic memories because of their very high squareness ratios, low coercivity and millimicroseconds switching time from one magnetic state to another within the magnetic plane 2.

A matrix of conductors are disposed over the magnetic plane 2. Row conductors 4 and 5 traverse the plane 2 spaced from and perpendicular to the column conductors 7, 8 and 9. The conductors are copper wires which are either drawn flat or of circular diameter.

In the preferred embodiment, the magnetic plane 2 is isotropic in directions mutually perpendicular to each other. The column and row conductors are aligned with these directions of isotropy. Storage locations within plane 2 are identified by the points of intersection of the row conductors 4 and 5 with the column conductors 7, 8 and 9. At these points of intersection the memory plane 2 has four possible remanent magnetic states. The four states are the opposed states of residual flux density along each of the two axes of easy magnetization.

The magnetic states of the storage locations are dependent upon magnetic fields emanating from the column and row conductors. A flow of current through a column or row conductor would establish a magnetic field at substantially 90° from the longitudinal direction of the conductor, which would cause the magnetic moments within the plane 2, adjacent the current carrying conductor, to rotate from a previous state to the direction of the magnetic field. The magnetic field is to be of sufficient intensity to switch the magnetic moments from one state of residual flux density along an axis of easy magnetization to another as determined by the direction of the magnetic field.

Writing information into and reading information out of the various storage locations within the magnetic plane 2 is accomplished by selectively applying currents or signals to the column and row conductors. The information stored within the magnetic plane 2 is represented by one of the four storage states available at each storage location within the magnetic plane 2.

Figure 2:
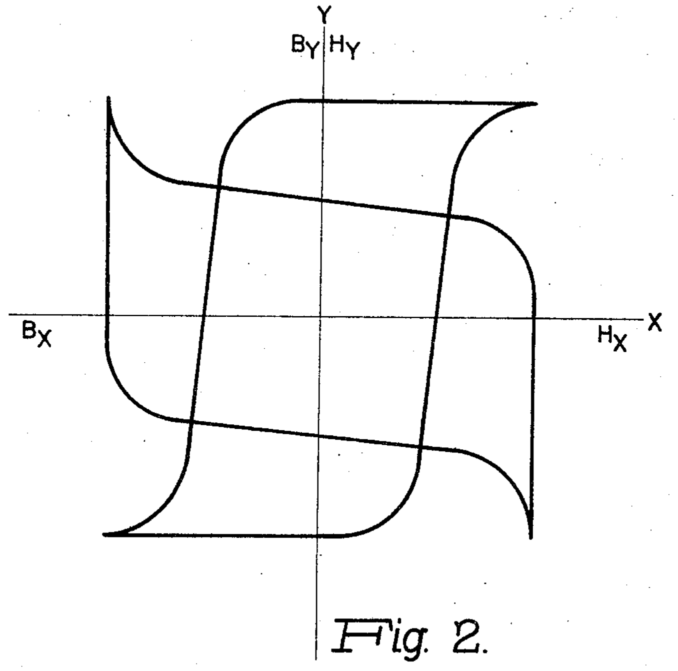
FIG. 2 is a graph of the magnetic characteristics of an isotropic magnetic film having two axes of easy magnetization which are mutually perpendicular to each other.

Selection of the column and row conductors are provided by line selectors 11 and 12 shown in FIG. 1. Row conductors 4 and 5 are connected in parallel to a line selector 11, which is in turn connected to the X pulse generator 16 by means of connector 15. Line selector 11 and X pulse generator 16 are respectively connected to control signal generator 14 by means of connectors 13 and 17. Column conductors 7, 8 and 9 are connected in parallel to line selector 12, which is in turn connected to control signal generator 14 by means of conductor 19 and a Y pulse generator 22 by means of conductor 20. Y pulse generator 22 is connected to the control signal generator 14 by means of conductor 23. The control signal generator 14 is capable of generating internally actuating or timing signals for causing the memory system to perform its basic function of altering the magnetic states at each of the storage locations within the memory plane 2 so as to conform to the magnetic characteristics of the isotropy of the memory plane 2, as shown by the hysteresis characteristics at a given storage location in FIG. 2.

Figure 3A:
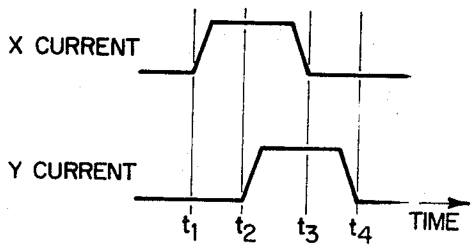
FIGS. 3*a* to 3*d*, 4*a* to 4*d*, 5*a* to 5*d*, and 6*a* to 6*d* represent input and output waveforms corresponding to different modes of operation in accordance with the invention and their respective states of magnetization in a storage location under the various conditions of operation in accordance with the invention.
Figure 3B:
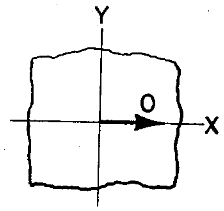
Figures 3C, 3D:
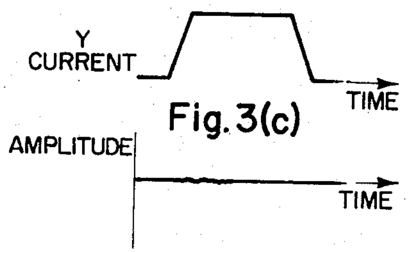

In the write cycle, the control signal generator 14 transmits a control signal by conductor 23 to Y pulse generator 22, causing it to emit a signal or pulse similar to the Y current shown in FIG. 3 (*a*). Simultaneously, control signal generator 14 transmits another control signal by conductor 19 to the line selector 12 which causes the selector 12 to transmit to the desired one of the column conductors 7, 8 and 9 the emitted signal which the pulse generator 22 transmits to the selector 12 by conductor 20.

A signal or pulse may be likewise applied to one of the row conductors. The control signal generator 14 transmits a control signal by conductor 17 to X pulse generator 16, causing it to emit a signal or pulse similar to the X current shown in FIG. 3 (*a*). Simultaneously, control signal generator 14 transmits a control signal by conductor 13 to line selector 11 to transmit to the desired one of the row conductors 4 and 5 the emitted signal which generator 16 transmits by conductor 15 to selector 11.

The amplitude of each of the signals applied to the selected column conductor and the selected row conductor is approximately half the current amplitude necessary for establishing a magnetic field at a storage location which has sufficient intensity for rotating magnetic moments at the storage location through the various states associated with the axes of easy magnetization and to cause a resultant residual flux density for the establishment of a new storage state. For writing information into a given storage location, therefore, it is necessary that at least a portion of one of the two signals be concurrent with one another at their mutually associated storage location.

Figure 4A:
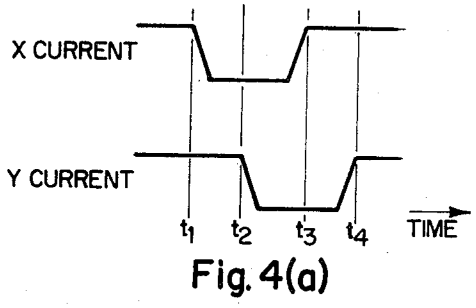
Figure 4B:
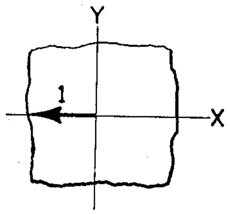
Figures 4C, 4D:
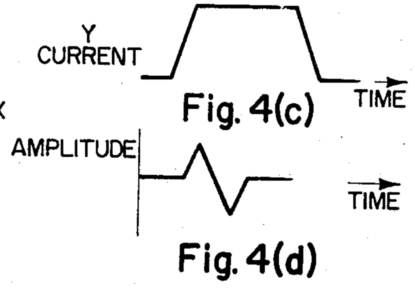

FIGS. 3, 4, 5 and 6 represent the possible timing sequences of the X and Y currents in relation to one another for establishing each of the four storage states possible at a given storage location. As shown in FIG. 3 (*a*) and (*b*) the polarity of the trailing edge of the last terminating positive polarity signal, e.g. the Y current, determines a stored ZERO. By reversing polarity of the Y current, the magnetic moments align in the opposite direction along the same axis of easy magnetization, thus constituting a stored ONE as shown in FIGS. 4 (*a*) and (*b*).

Figure 5A:
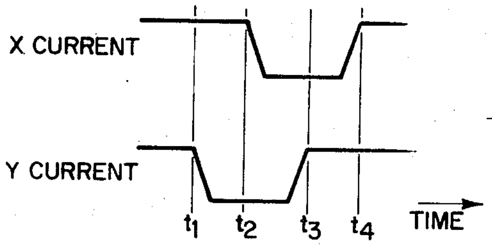
Figure 5B:
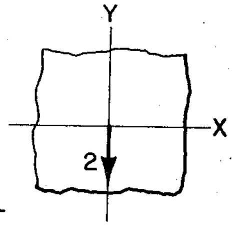
Figures 5C, 5D:
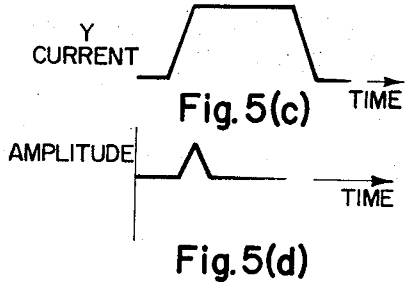
Figure 6A:
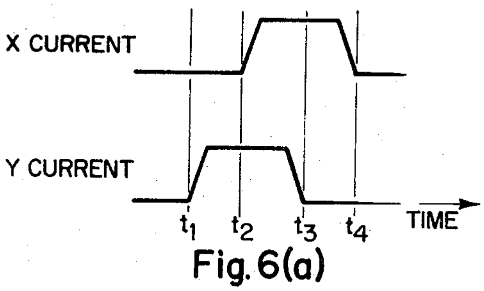
Figure 6B:
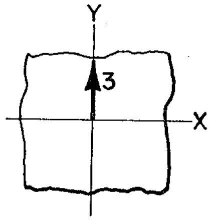
Figures 6C, 6D:
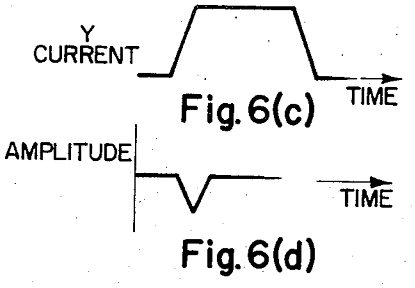

FIG. 5(*a*) and (*b*) shows that the positive polarity of the trailing edge of the last terminating X current determines yet another state associated with the other axis of easy magnetization which may be designated a stored TWO. The fourth state, THREE, is in the opposite direction along the same axis of easy magnetization and is determined by reversing the polarity of the last terminating X current as shown in FIG. 6(*a*) and (*b*).

In FIGS. 3–6 the concurrency of the current signals is evident between times T2 and T3 to insure a combined magnetic flux of sufficient intensity to cause a change in state from a former stored state and a residual flux density for storage of information in the new storage state. Also FIGS. 3–6 show the X and Y currents to be of the same polarity in the writing of each state. While this is desirable for the optimization of performance for the writing process in the preferred embodiment, it is not necessary for practicing the invention. All that is necessary is a portion of concurrence between the two signals to insure a combined magnetic flux at their mutually respective storage location which insures the necessary switching and storage characteristics.

In the read mode of operation, the control signal generator 14 transmits a control signal by conductor 23 to Y pulse generator 22, causing it to emit a signal similar to that shown in FIGS. 3(*c*)–6(*c*). Simultaneously, the control signal generator 14 transmits a control signal by conductor 19 to the line selector 12 which causes the selector 12 to transmit to at least one of the column conductors associated with the desired storage locations to be read the emitted signal which the generator 22 transmits by conductor 20 to the selector 12. This applied read current disturbs the resultant magnetic moment lying in a direction along one of the two axes of easy magnetization from its storage position. For the applied current to be of the proper amplitude to insure a read out which will distinguish between each of the four possible storage states, it is at least twice that of the amplitude of the write currents or signals. The read signal so defined establishes a read-magnetic field of sufficient intensity to couple its respective storage locations and to rotate the resultant magnetic moments at each of the respective locations from their original state to the state determined by the direction of the read magnetic field. The changes in state within a storage location induce a voltage in the row conductor which is associated with it. Sense amplifiers 24 and 25 are connected respectively to row conductors 4 and 5 for the sensing of any induced voltages within the row conductors. A display unit 28 is connected to sense amplifiers 24 and 25 to display any induced voltages. The display unit 28 would be any conventional cathode ray tube display with X and Y coordinates for viewing the amplitude and duration of a voltage signal.

It would also be within the state of the art to provide an alternative unit to display unit 28 for the detection of each of the four voltage signals. For example, a digital representation of each of these signals could be implemented through conventional logic design.

The magnetic field established by the read current of FIG. 3(*c*) would be in the same direction as the alignment of the magnetic moments representing a stored ZERO of FIG. 3(*b*). Therefore, as shown in FIG. 3(*d*), there would be no change in magnetic state within the storage location and no resulting induced voltage to be viewed on the display unit 28. A stored ONE would be viewed on a read out of a given storage location as a bipolar signal as shown in FIG. 4(*d*), since the stored magnetic moments must pass through two storage states to the direction of the read-magnetic field. FIG. 5(*d*) represents the read output of a stored TWO; while FIG. 6(*d*) represents the read output of a stored THREE. The reading of information which was written into a storage location having four possible storage states may therefore distinguish between the stored states to provide for an effective memory read-out.

If hydrogen is used as a carrier gas in the deposition of the magnetic layer or plane 2 according to Edelman's teaching, then a completely isotropic magnetic film is obtained so long as the rotating, circular magnetic field rotates at a uniform speed. To provide for the multiplicity of magnetic states then possible beyond the four of the preferred embodiment, additional conductor matrices would be disposed over the magnetic plane 2 in accordance with the teaching of the preferred embodiment.

Obviously, many modifications of the present invention are possible in the light of the above teaching. It is therefore to be understood that, in the scope of the appended claims, the invention may be practiced otherwise then as specifically described.

What is claimed is:

1. An isotropic thin film memory system for reading and writing information out of and into defined storage locations each of which has multiple storage states, said system comprising, in combination:

- a thin film memory plane having a surface of substantially isotropic magnetic material,
- a plurality of column conductors disposed adjacent said surface and substantially parallel with one another,
- a plurality of row conductors which are substantially parallel with one another and are spaced from and transverse to said column conductors,
- said storage locations being located within said magnetic surface and associated with the points of intersection of said column and row conductors,
- first generating means for generating signals of a prescribed amplitude applied to respective column and row conductors for writing information into mutually respective storage locations, said prescribed amplitude signals to said column conductors having the same magnitude as said prescribed amplitude signals to said row conductors,
- said first generating means including second means for generating a signal of an amplitude at least twice said prescribed amplitude applied to at least one of said column conductors for reading information out of associated storage locations, and
- sensing means coupled to said row conductors for detecting the information read out of the storage locations.

2. The thin film memory system as defined in claim 1 wherein selector means are coupled to said generating means and said conductors for selecting column and row conductors to carry respective signals for writing information into associated storage locations and for selecting a given column conductor to carry a signal for reading information out of associated storage locations.

3. The thin film memory system as defined in claim 1 wherein said magnetic material is isotropic in directions mutually perpendicular to each other and said column and row conductors are aligned with respective isotropic directions and are substantially perpendicular to each other.

4. The thin film memory system as defined in claim 3 wherein said first generating means includes means for timing said signals to be carried by respective column and row conductors for writing information into a given storage location so that one signal leads and is concurrent with a portion of the other at said storage location, whereby the other signal determines the storage state of said storage location.

5. A planar memory having a plurality of storage locations in a magnetic plane, each location being associated with a respective point of intersection of column and row conductors disposed over the magnetic memory plane, comprising:

a continuous plane of isotropic magnetic material that has two axes of easy magnetization which are mutually perpendicular to each other, said magnetic material being capable of attaining opposed states of residual flux density along each of said axes of easy magnetization and having magnetic moments capable of being rotated through said states by the application of a magnetic field of a prescribed intensity;

a plurality of column conductors disposed over said magnetic plane and aligned with one axis of magnetization so that a flow of current therethrough establishes a first magnetic field at substantially 90° from said axis;

a plurality of row conductors spaced from and transverse to said column conductors and aligned with the other axis of easy magnetization so that a flow current therethrough establishes a second magnetic field at substantially 90° from said axis;

means for selectively producing a first current flow through at least one of said column conductors and a second current flow through at least one of said row conductors to establish a combined write-magnetic field of sufficient intensity to couple their mutually respective storage locations and attain a state of residual flux density along one of said axes of easy magnetization according to the polarity of the last terminating current flow; and means for selectively producing a current flow through at least one of said column conductors to establish a read-magnetic field of sufficient intensity to couple its respective storage locations and to rotate the magnetic moments at said respective locations from their original state to the state determined by the direction of said read-magnetic field; and means coupled to said row conductors for sensing the change or absence of change in state of said magnetic moments at said respective locations.

6. A method of writing information into and reading information out of storage locations having several storage states in an isotropic magnetic layer of an addressable memory having a matrix of column and row conductors which are magnetically coupled to the storage locations when carrying electrical signals, comprising the steps of driving at least one column conductor with a first write signal of a prescribed amplitude;

driving at least one row conductor with a second write signal of said prescribed amplitude, said second signal being concurrent with a portion of said first write signal such that the last terminating one of said signals determines the storage state at the storage locations magnetically coupled at the intersections of said driven column and row conductors;

driving at least one column conductor with a read signal of an amplitude at least twice said prescribed amplitude; and sensing said row conductors during said read-driving step to detect the changes or absence of change in state which identify the storage states at the locations magnetically coupled to said driven column conductors.

* * * * *